US011387502B2

United States Patent
Shimizu et al.

(10) Patent No.: US 11,387,502 B2
(45) Date of Patent: Jul. 12, 2022

(54) BATTERY MODULE COMPRISING A HEAT TRANSFER COMPONENT AND A THERMAL EXPANSION MATERIAL BETWEEN CELLS

(71) Applicant: Panasonic Intellectual Property Management Co., Ltd., Osaka (JP)

(72) Inventors: Keisuke Shimizu, Osaka (JP); Shinya Motokawa, Hyogo (JP); Chifumi Murayama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 168 days.

(21) Appl. No.: 16/638,986

(22) PCT Filed: Jan. 22, 2019

(86) PCT No.: PCT/JP2019/001804
§ 371 (c)(1),
(2) Date: Feb. 13, 2020

(87) PCT Pub. No.: WO2019/151037
PCT Pub. Date: Aug. 8, 2019

(65) Prior Publication Data
US 2020/0203784 A1 Jun. 25, 2020

(30) Foreign Application Priority Data
Jan. 31, 2018 (JP) .............................. JP2018-015252

(51) Int. Cl.
*H01M 10/613* (2014.01)
*H01M 10/617* (2014.01)
(Continued)

(52) U.S. Cl.
CPC ....... *H01M 10/613* (2015.04); *H01M 10/617* (2015.04); *H01M 10/651* (2015.04);
(Continued)

(58) Field of Classification Search
CPC .. H01M 10/613; H01M 50/20; H01M 10/617; H01M 10/651; H01M 10/6555; H01M 10/647; H01M 10/658; Y02E 60/10
See application file for complete search history.

(56) References Cited

U.S. PATENT DOCUMENTS

| 2011/0052960 A1* | 3/2011 | Kwon ............... H01M 10/0481 |
| | | 429/120 |
| 2011/0195291 A1* | 8/2011 | Yokoyama ........... H01M 50/24 |
| | | 429/99 |

FOREIGN PATENT DOCUMENTS

| JP | 5960289 B | 8/2016 |
| JP | 2018-137065 | 8/2018 |

(Continued)

OTHER PUBLICATIONS

Machine translation of WO 2012/172829 (Year: 2012).*
International Search Report of PCT application No. PCT/JP2019/001804 dated Mar. 5, 2019.

*Primary Examiner* — Kwang Han
(74) *Attorney, Agent, or Firm* — McDermott Will & Emery LLP

(57) ABSTRACT

A battery module includes a first heat transfer component and a first thermal expansion material member that are disposed between the battery cells adjacent to each other. The first thermal expansion material member has a thermal conductivity lower than a thermal conductivity of the first heat transfer component and expands at a first predetermined temperature or higher, in which when temperature of the first thermal expansion material member is less than the first predetermined temperature, the adjacent battery cells are connected to each other via a high thermal conductive route including the first heat transfer component and having a first thermal conductivity, and in which when the temperature of the first thermal expansion material member reaches the first (Continued)

predetermined temperature or higher, the adjacent battery cells are connected to each other via a low thermal conductive route having a second thermal conductivity lower than the first thermal conductivity.

7 Claims, 14 Drawing Sheets

(51) Int. Cl.
    *H01M 10/651*     (2014.01)
    *H01M 10/6555*     (2014.01)
    *H01M 50/20*     (2021.01)
    *H01M 10/647*     (2014.01)

(52) U.S. Cl.
    CPC ....... *H01M 10/6555* (2015.04); *H01M 50/20* (2021.01); *H01M 10/647* (2015.04)

(56) References Cited

FOREIGN PATENT DOCUMENTS

| WO | 2010/143408 | 12/2010 | | |
|---|---|---|---|---|
| WO | WO 2012172829 | * 12/2012 | .......... | H01M 10/658 |

* cited by examiner

BATTERY MODULE COMPRISING A HEAT TRANSFER COMPONENT AND A THERMAL EXPANSION MATERIAL BETWEEN CELLS

CROSS-REFERENCE TO RELATED APPLICATIONS

This application is a U.S. national stage application of the PCT International Application No. PCT/JP2019/001804 filed on Jan. 22, 2019, which claims the benefit of foreign priority of Japanese patent application 2018-015252 filed on Jan. 31, 2018, the contents all of which are incorporated herein by reference.

TECHNICAL FIELD

The present disclosure relates to a battery module and a battery pack.

BACKGROUND ART

A conventionally known battery pack includes a plurality of battery modules. Further, the plurality of battery modules are formed independently of one another. For instance, PTL 1 describes a configuration in which a plurality of single cells (battery cells) that are prismatic batteries are disposed side by side with respective spacers therebetween, and long bind bars are disposed on both widthwise sides of the plurality of single cells. In this configuration, both ends of each bind bar are fixed to two end plates that are disposed at respective ends of an array of the plurality of single cells in a battery module. In the battery module, connection plates are disposed at both height-wise ends of the single cells, and both ends of each connection plate are fixed to the end plates. The plurality of battery modules are arranged in a height-wise direction, and an intermediate bracket is disposed between the adjacent battery modules. Both ends of the intermediate bracket are fixed to the end plates of the battery modules.

CITATION LIST

Patent Literature

PTL 1: Japanese Patent No. 5960289

SUMMARY OF THE INVENTION

A battery pack contains the battery modules that each include the plurality of the electrically connected single battery cells. If part of the battery cells in the battery pack abnormally generates heat in the event of an anomaly, a thermal impact may spread to the battery cells surrounding the abnormal battery cell. Thus, a possible countermeasure consists of installing a low-heat-conductive insulator as a separator between the adjacent battery cells in each of the battery modules to hinder the transmission of heat from the battery cell that has abnormally generated heat to the other battery cells. Unfortunately, this countermeasure can create a possibility that most of a surface of each of the battery cells is covered with a heat insulating material. As a result, heat generated from the battery cell by charging or discharging under normal use conditions is less likely to be discharged to an outside. This can cause temperature of the battery cell to get high and damage an electrical characteristic of the battery cell. Further, the heat insulator is disposed between the adjacent battery cells. This increases variation in temperature among the battery cells under normal use conditions, causing a difference in battery characteristic among the plurality of battery cells in each of the battery modules.

A battery module, according to an aspect of the present disclosure, including a plurality of battery cells arranged side by side in a first direction, the battery module includes a first heat transfer component and a first thermal expansion material member that are disposed between at least one set of the battery cells adjacent to each other, in which the first thermal expansion material member has a thermal conductivity lower than a thermal conductivity of the first heat transfer component and expands at a first predetermined temperature or higher, in which when temperature of the first thermal expansion material member is less than the first predetermined temperature, the at least one set of the adjacent battery cells are connected to each other via a high thermal conductive route including the first heat transfer component and having a first thermal conductivity, and in which when the temperature of the first thermal expansion material member reaches the first predetermined temperature or higher, the at least one set of the adjacent battery cells are connected to each other via a low thermal conductive route having a second thermal conductivity lower than the first thermal conductivity.

A battery pack according to an aspect of the present disclosure includes the battery module according to the present disclosure, a cooling plate disposed on a first side of the battery module in a second direction orthogonal to the first direction, a third heat transfer component including a first part put into contact with the cooling plate and a second part disposed between the at least one set of the adjacent battery cells, and a fourth heat transfer component and a second thermal expansion material member that are disposed between each of the at least one set of the adjacent battery cells and the second part, in which the second thermal expansion material member has a thermal conductivity lower than thermal conductivities of the third heat transfer component and the fourth heat transfer component and expands at a second predetermined temperature or higher, in which when temperature of the second thermal expansion material member is less than the second predetermined temperature, each of the at least one set of the adjacent battery cells and the second part are connected to each other via a high thermal conductive route including the fourth heat transfer component and having a third thermal conductivity, and in which when the temperature of the second thermal expansion material member reaches the second predetermined temperature or higher, each of the at least one set of the adjacent battery cells and the second part are connected to each other via a low thermal conductive route having a fourth thermal conductivity lower than the third thermal conductivity.

In accordance with the battery module and the battery pack according to the present disclosure, when part of the battery cells abnormally generates heat and the temperature of the first thermal expansion material member reaches the first predetermined temperature or higher, the adjacent battery cells are connected to each other via the low thermal conductive route. This configuration inhibits the spread of a thermal impact from the battery cell that has abnormally generated heat to the other battery cells. When the temperature of the first thermal expansion material member is less than the first predetermined temperature under normal use conditions, the adjacent battery cells are connected to each other via the high thermal conductive route. This configuration can reduce variation in temperature among the plurality of battery cells. At the same time, this configuration can prevent the battery cells from reaching an excessively high temperature under normal use conditions.

In accordance with the battery pack according to the present disclosure, when the temperature of the second thermal expansion material member reaches the second predetermined temperature or higher, each of the adjacent battery cells and the second part of the cooling plate are connected to each other via the low thermal conductive route having the fourth thermal conductivity. Thus, the battery pack including the cooling plate disposed between the adjacent battery cells can inhibit the spread of a thermal impact of the battery cell that has abnormally generated heat. When the temperature of the second thermal expansion material member is less than the second predetermined temperature under normal use conditions, each of the adjacent battery cells and the second part of the cooling plate are connected to each other via the high thermal conductive route having the third thermal conductivity. Thus, the battery pack including the cooling plate disposed between the adjacent battery cells can reduce variation in temperature among the plurality of battery cells and cool the plurality of battery cells by the cooling plate under normal use conditions.

DESCRIPTION OF EMBODIMENT

Figure 1:
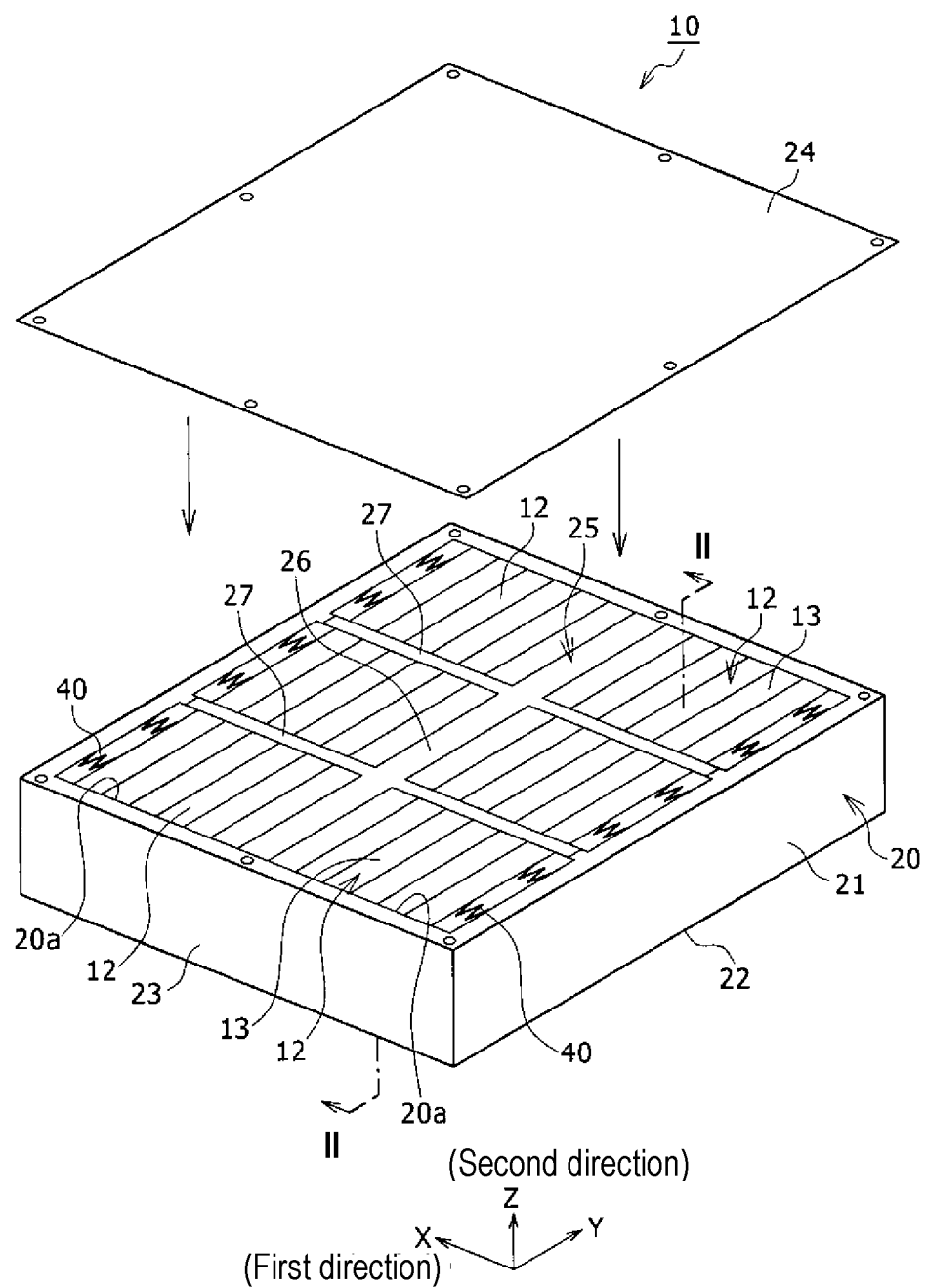
FIG. 1 is an exploded perspective view of a battery pack including a battery module according to an example of an exemplary embodiment, with some components detached from the battery pack.

A battery module and a battery pack according to an example of an exemplary embodiment will be described below in detail. Drawings referenced in a description of the exemplary embodiment are schematically drawn, and dimensions and proportions of configuration elements illustrated in the drawings may differ from those of actual components. Thus, specific dimensions and proportions should be understood in view of the following description. In the description given herein, "substantially identical" means absolutely identical, as well as virtually identical, for example. Other words modified by "substantially" should be interpreted in the same manner. An "end" of an object means an edge and a surrounding portion of the object. Shapes, materials, piece counts, and other particulars described below are provided for the purpose of illustration and may be changed depending on specifications of battery modules and battery packs. In the following description, identical or equivalent components are denoted by identical reference signs.

FIG. 1 is an exploded perspective view of battery pack 10 with some components detached from battery pack 10. In battery pack 10, a plurality of battery modules 12 are arranged and are divided into two groups in longitudinal direction X. In each group, three battery modules 12 are arranged side by side in lateral direction Y. Longitudinal direction X and lateral direction Y are orthogonal to each other.

In one example, FIG. 1 illustrates a case in which three battery modules 12 are adjacent to each other in each row in lateral direction Y and two battery modules 12 are adjacent to each other in each column in longitudinal direction X. In FIG. 1 and FIGS. 2 to 5 described later, a longitudinal direction is indicated by X, a lateral direction is indicated by Y, and a height direction orthogonal to both X and Y is indicated by Z. Longitudinal direction X is equivalent to a first direction, and height direction Z is equivalent to a second direction.

Battery pack 10 includes pack case 20, the plurality of battery modules 12, and a plurality of springs 40. Pack case 20 has case body 21 and lid 24. Case body 21 has outer peripheral wall 23 erected on an entire edge of bottom plate 22 having a rectangular shape. Case body 21 has an aperture on a top. In the description given below, the aperture is formed on the top of case body 21 and bottom plate 22 is formed on a bottom of case body 21. The top and the bottom are terms used for the convenience of description.

Lid 24 has a rectangular, planar shape. Lid 24 is attached to an upper edge of case body 21 with bolts, for example, thereby covering the aperture to constitute pack case 20.

In an internal space of case body 21, partition part 25 is disposed on an upper surface of bottom plate 22. Partition part 25 includes first wall 26 extending laterally at a middle in longitudinal direction X and two second walls 27 being apart from each other in lateral direction Y and extending in longitudinal direction X from either of both side surfaces of first wall 26 in longitudinal direction X. As a result, the internal space of case body 21 is divided into six battery storage rooms 20a having the substantially same size. The plurality of battery modules 12 are arranged in the plurality of respective battery storage rooms 20a. A length of first wall 26 in lateral direction Y is substantially equal to a length of the internal space of case body 21 in lateral direction Y. A length of second wall 27 in longitudinal direction X is substantially equal to a length of battery storage room 20a in longitudinal direction X.

Figure 2:
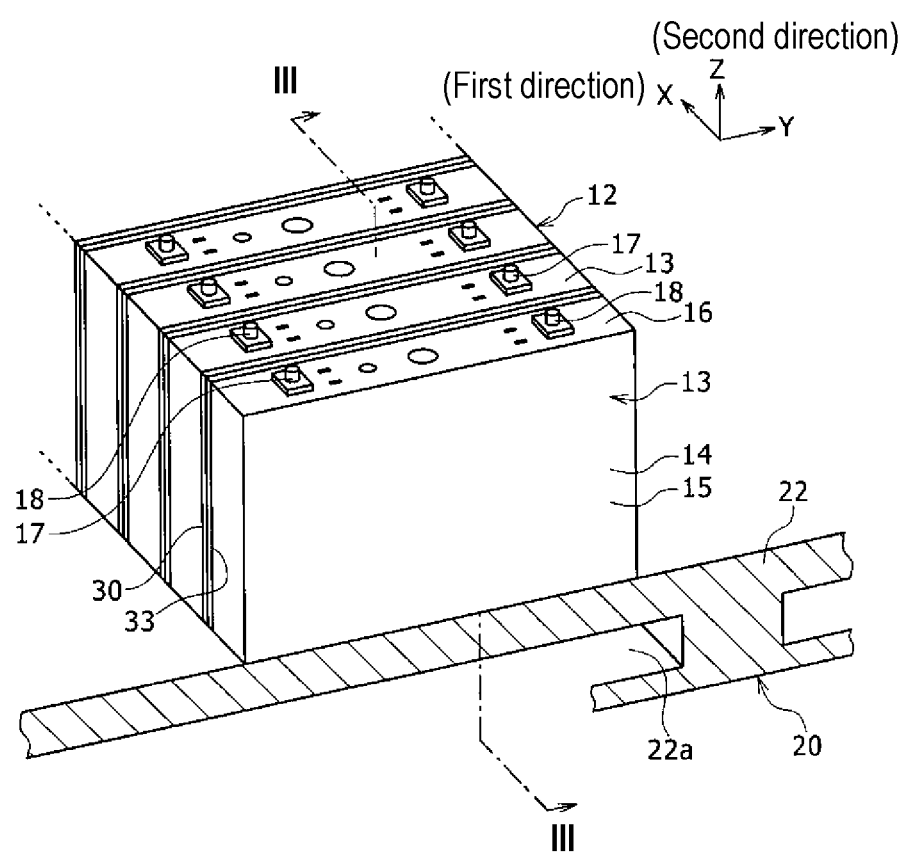
FIG. 2 is an enlarged perspective view of a cross section taken along line II-II of FIG. 1.
Figure 3:
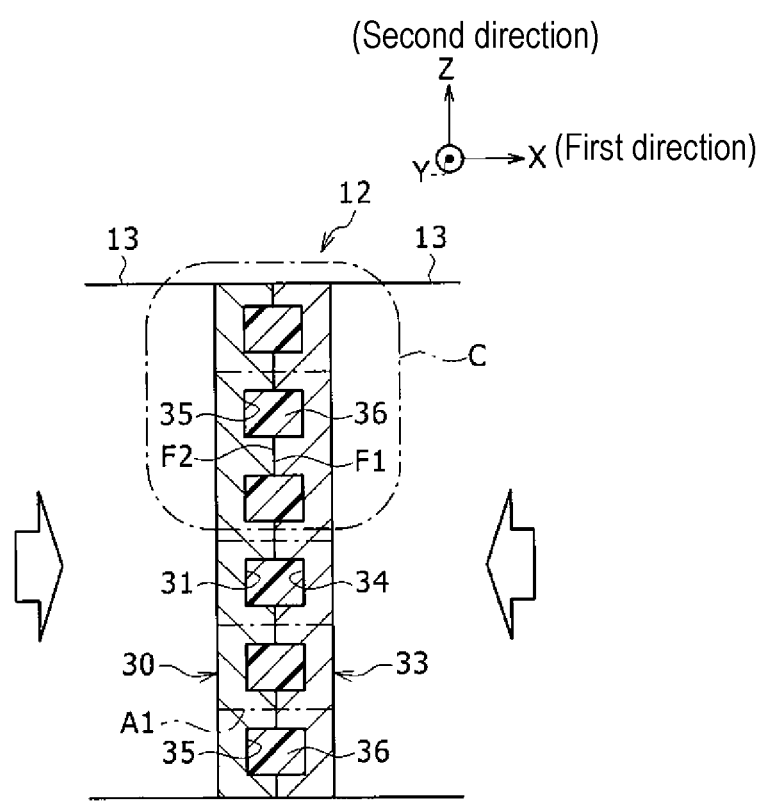
FIG. 3 is a cross-sectional view of the battery module under normal use conditions taken along line III-III of FIG. 2, with some components omitted.

FIG. 2 is an enlarged perspective view of a cross section taken along line II-II of FIG. 1. FIG. 3 is a cross-sectional view of the battery module under normal use conditions taken along line III-III of FIG. 2, with some components omitted. As illustrated in FIG. 2, each battery module 12 includes battery cells 13, a plurality of single cells, that are arranged side by side in longitudinal direction X with two heat transfer components and a thermal expansion material member, which are described later, interposed between the adjacent battery cells.

With reference back to FIG. 1, each spring 40 is disposed between an end of battery module 12 in longitudinal direction X and an inner surface of case body 21. Spring 40 applies an elastic force to battery module 12 in a direction toward the side surface of first wall 26 of partition part 25. Thus, an elastic force is applied to battery modules 12 so as to compress the battery modules from both sides in longitudinal direction X.

Preferably, partition part 25 is fixed to bottom plate 22 of case body 21 by fixing means such as an adhesive agent or a fastening member. Preferably, partition part 25 is not movable relative to case body 21.

On the other hand, partition part 25 may not be fixed to case body 21. Instead of the springs, a case-side end plate (not illustrated) having one or more elastic piece may be disposed on an outside end of both ends of each battery module 12 remote from first wall 26 of partition part 25 in longitudinal direction X. For instance, the elastic piece has a curved shape having an outward protrusion and an arc-shaped cross section, extending outward, i.e., to a side remote from first wall 26 in longitudinal direction X. The case-side end plate is disposed such that a distal end of the elastic piece is pressed against an inner wall surface of case body 21 and is thereby elastically deformed. The case-side end plate can also apply an elastic force to battery module 12 in a direction toward the side surface of first wall 26 of partition part 25 and thus apply an elastic force to battery modules 12 so as to compress the battery modules from both sides in longitudinal direction X.

Next, a configuration of battery cells 13, the heat transfer components, and the thermal expansion material member included in battery module 12 will be described. As illustrated in FIG. 2, each battery cell 13 is a prismatic (=rectangular), dischargeable secondary battery. Examples of the secondary battery include lithium ion batteries. Alternatively, the secondary battery may be another battery such as a nickel metal hydride battery. Each battery cell 13 includes: cell case 14 that has a cuboid shape or a rectangular parallelepiped shape; and an electrode assembly (not illustrated) contained in cell case 14 together with electrolyte. Cell case 14 is formed by covering an upper aperture of box-shaped cell case body 15 with sealing plate 16. The electrode assembly is formed by alternately laminating (or stacking) positive-electrode and negative-electrode plates with separators therebetween. Positive-electrode terminal 17 and negative-electrode terminal 18 protrude from respective ends of sealing plate 16 in a lengthwise direction. Positive-electrode terminal 17 is connected to the positive-electrode plate, whereas negative-electrode terminal 18 is connected to the negative-electrode plate.

The plurality of battery cells 13 in each battery module 12 are arranged side by side in longitudinal direction X with first and second heat transfer components 30, 33 and thermal expansion material member 36 (see FIG. 3), which are described later, interposed between the adjacent battery cells. Further, in the lengthwise direction of sealing plates 16, the positions of positive-electrode terminals 17 and negative-electrode terminals 18 on adjacent battery cells 13 are opposite to each other. Positive-electrode terminal 17 and negative-electrode terminal 18 adjacent to each other on adjacent battery cells 13 in longitudinal direction X are connected together via bus bars (not illustrated), so that the plurality of battery cells 13 are electrically connected in series.

Alternatively, of the plurality of battery cells 13, the positive-electrode terminals may be disposed at one ends of sealing plates 16 in the lengthwise direction, and the negative-electrode terminals may be disposed at the other ends of sealing plates 16 in the lengthwise direction. Further, the plurality of positive-electrode terminals disposed side by side in longitudinal direction X may be connected together via a bus bar, whereas the plurality of negative-electrode terminals disposed side by side in longitudinal direction X may be connected together via another bus bar. In this way, the plurality of battery cells 13 may be electrically connected together in parallel. Alternatively, some of the plurality of battery cells 13 are electrically connected in parallel to form a battery cell group. Then, a plurality of battery cell groups formed in this manner may be electrically connected in series.

As illustrated in FIG. 3, in battery module 12, first heat transfer component 30 and second heat transfer component 33 that are disposed opposite to each other in longitudinal direction X and thermal expansion material member 36 put between first and second heat transfer components 30, 33 are disposed between battery cells 13 adjacent to each other in longitudinal direction X.

First heat transfer component 30 is disposed at a first side (a left side in FIG. 3) between battery cells 13 in longitudinal direction X, whereas second heat transfer component 33 is disposed at a second side (a right side in FIG. 3) between battery cells 13 in longitudinal direction X.

Figure 4:
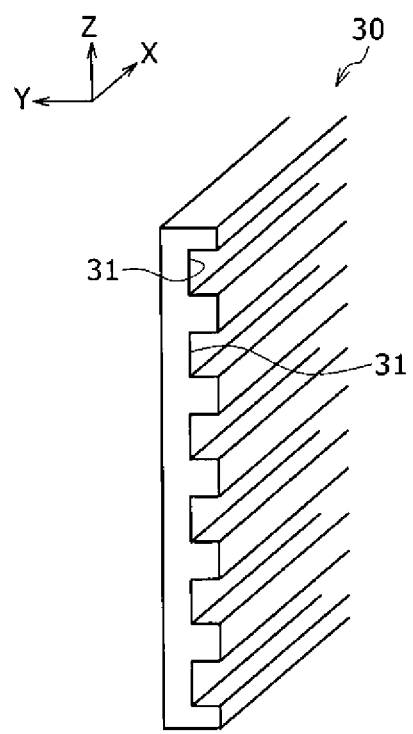
FIG. 4 is a perspective view of a first heat transfer component illustrated in FIG. 3.

FIG. 4 is a perspective view of first heat transfer component 30. First heat transfer component 30 is a metal plate member put into surface contact with a side surface of battery cell 13 that is one of adjacent battery cells 13 (the left-side battery cell in FIG. 3). Specifically, first heat transfer component 30 is a plate-shaped member that is made of a metallic material or other material with high thermal conductivity, such as iron or aluminum alloy. In battery module 12 that is built up, first heat transfer component 30 has a rectangular plate shape that is long in lateral direction Y. Hence, a lengthwise direction of first heat transfer component 30 agrees with lateral direction Y.

A first surface of first heat transfer component 30 (a left surface in FIG. 4) put into contact with battery cell 13 in a thickness direction is planar. Meanwhile, in a second surface of first heat transfer component 30 (a right surface in FIG. 4) adjacent to thermal expansion material member 36 (see FIG. 3) in the thickness direction, a plurality of grooves 31 each extending in the lengthwise direction (lateral direction Y) are formed so as to be arranged side by side in height direction Z (a vertical direction in FIG. 4). Both ends of each groove 31 in lateral direction Y reach both end faces of first heat transfer component 30 in lateral direction Y. Groove 31, for example, includes a planar upper surface and a planar lower surface that are separated from and parallel to each other in the vertical direction and a planar bottom surface orthogonal to the upper and the lower surfaces.

A thermal conductivity of first heat transfer component 30 is greater than or equal to 200 W/m·K, for example. In battery module 12, first heat transfer component 30 is connected to battery cell 13 such that heat is transferable between the two parts by, for example, being put into contact with the side surface of battery cell 13 in longitudinal direction X.

With reference back to FIG. 3, second heat transfer component 33 is a metal plate member put into surface contact with a side surface of battery cell 13 that is the other adjacent battery cell 13 (the right-side battery cell in FIG. 3). Specifically, second heat transfer component 33 is made of a material identical to the material for first heat transfer component 30 and has a shape substantially identical to the shape of first heat transfer component 30. Thus, in a second surface of second heat transfer component 33 (a left surface in FIG. 3) in the thickness direction, a plurality of grooves 34 each extending in lateral direction Y are formed so as to be separated from each other in height direction Z.

As illustrated in FIG. 3, first and second heat transfer components 30, 33 are disposed between adjacent battery cells 13 such that the second surfaces of the heat transfer components adjacent to grooves 31, 34 in the thickness direction face each other. In this state, end faces F1, F2 located on the second surfaces of first and second heat transfer components 30, 33 in the thickness direction are formed at places other than grooves 31, 34 in height direction Z and are put into surface contact with each other at a plane orthogonal to longitudinal direction X. As a result, in first and second heat transfer components 30, 33, grooves 31, 34 facing each other form a plurality of heat-transfer inner rooms 35, linear spaces extending in lateral direction Y. Second heat transfer component 33 may be made of a material different from the material for first heat transfer component 30.

Thermal expansion material member 36 is disposed in each of the plurality of heat-transfer inner rooms 35 such that each of the inner rooms is filled with the material. Thermal expansion material member 36 is equivalent to a first thermal expansion material member. Thermal expansion material member 36 is, for example, made up of a resin foam material and has a thermal conductivity lower than that of each of first and second heat transfer components 30, 33. Thermal expansion material member 36 expands at first predetermined temperature K1 (e.g., 150° C.) or higher and does not expand at temperatures less than first predetermined temperature K1.

For instance, thermal expansion material member 36 is made of a resin foam material that foams and expands at first predetermined temperature K1 or higher. For instance, the thermal conductivity of thermal expansion material member 36 is lower than the thermal conductivity of each of first and second heat transfer components 30, 33 and lower than the thermal conductivity of pack case 20. The thermal conductivity of thermal expansion material member 36 is, for example, less than 0.2 W/m·K.

Thus, first heat transfer component 30 is disposed adjacent to battery cell 13, one of adjacent battery cells 13 (left-side battery cell 13 in FIG. 3), so as to be put into contact with battery cell 13. Thermal expansion material member 36 is disposed in each of the grooves formed in the surface of first heat transfer component 30 adjacent to other adjacent battery cell 13 (the right-side battery cell in FIG. 3).

Second heat transfer component 33 is disposed on an opposite side of each thermal expansion material member 36 from first heat transfer component 30 between adjacent battery cells 13 and is put into contact with the other adjacent battery cell 13. Thus, at temperatures less than first predetermined temperature K1, thermal expansion material member 36 does not expand and hence first heat transfer component 30 and second heat transfer component 33 are put into contact with each other through end faces F1, F2. As a result, adjacent battery cells 13 are connected to each other via a high thermal conductive route including first heat transfer component 30 and second heat transfer component 33 and having first thermal conductivity R1. The high thermal conductive route does not include each thermal expansion material member 36. In FIG. 3, the high thermal conductive route is indicated by dot-and-dash lines A1.

Figure 5:
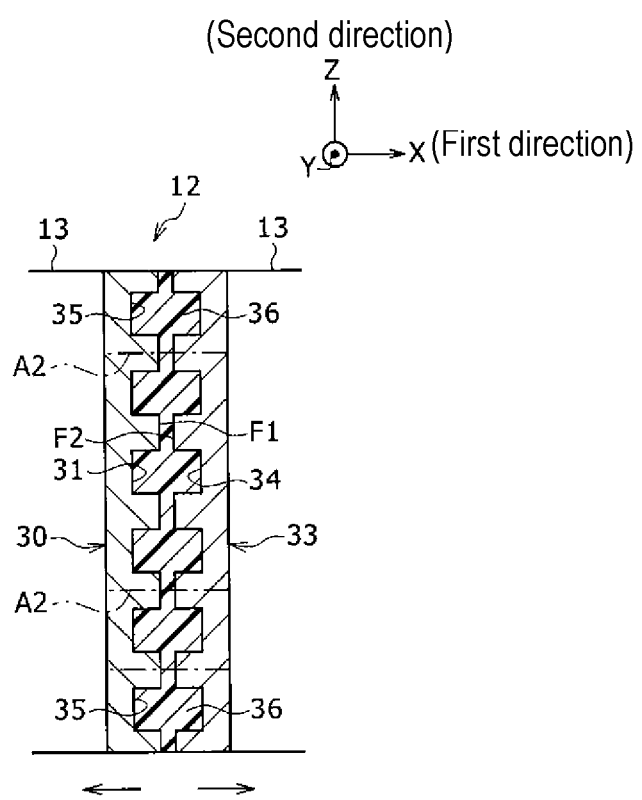
FIG. 5 is a diagram comparable to FIG. 3, illustrating the battery module under conditions of abnormal heat generation.

Meanwhile, when temperature of thermal expansion material member 36 is higher than or equal to first predetermined temperature K1, each thermal expansion material member 36 expands in longitudinal direction X and as illustrated in FIG. 5, first heat transfer component 30 and second heat transfer component 33 are thereby separated from each other in longitudinal direction X and get into a state of noncontact. In this state, thermal expansion material member 36 also goes into a gap between end faces F1, F2 of first heat transfer component 30 and second heat transfer component 33. As a result, when the temperature of thermal expansion material member 36 is higher than or equal to first predetermined temperature K1, adjacent battery cells 13 are connected to each other via a low thermal conductive route having second thermal conductivity R2 lower than first thermal conductivity R1. The low thermal conductive route includes each thermal expansion material member 36. In FIG. 5, the low thermal conductive route is indicated by dot-and-dash lines A2.

For instance, first thermal conductivity R1 is greater than or equal to 120 W/m·K, and second thermal conductivity R2 is less than 0.5 W/m·K.

This configuration, as described later, can inhibit the spread of a thermal impact created when part of battery cells 13 abnormally generates heat due to the occurrence of an anomaly (=abnormality) while battery module 12 is in use. This configuration can also reduce variation in temperature among the plurality of battery cells 13 and prevent battery cells 13 from reaching an excessively high temperature under normal use conditions.

In each battery module 12, an insulating member such as insulating sheet or an insulating film may be disposed between each of first heat transfer component 30 and second heat transfer component 33 and battery cell 13. An insulating film may be stuck on at least a surface of each of first and second heat transfer components 30, 33 that comes into contact with battery cell 13.

As illustrated in FIG. 2, bottom plate 22 of pack case 20 is equivalent to a cooling plate used to cool battery modules 12. For example, coolant passages 22a through which coolant such as air or water flows are formed at a plurality of locations in bottom plate 22. Coolant passages 22a are connected to a coolant flow path (not illustrated) outside battery pack 10. FIG. 1 does not illustrate the coolant passages provided in bottom plate 22. It should be noted that the coolant passages do not necessarily have to be formed in bottom plate 22. Alternatively, for example, a shape or material that exhibits a good radiation performance may be used for bottom plate 22.

With reference back to FIG. 1, case body 21 of pack case 20 accommodates the plurality of battery modules 12. In this state, a circuit board (not illustrated) having flexibility is disposed on upper sides of the plurality of battery modules 12, with an upper insulating paper sheet (not illustrated) interposed between the circuit board and the battery modules. Mounted on the circuit board are a central processing unit (CPU), memory, and other components. The circuit board is connected to positive-electrode terminals 17 (see FIG. 2) of corresponding battery cells 13 and monitors voltages applied across individual battery cells 13. Furthermore, in order to measure temperatures of battery cells 13, the circuit board may be connected to temperature measuring units that are in contact with the positive-electrode or negative-electrode terminals or bus bars connected to the positive-electrode or negative-electrode terminals. Lid 24 is coupled to case body 21 so as to cover an upper surface of the circuit board. Optionally, the circuit board may be disposed outside pack case 20.

According to battery module 12 and battery pack 10 described above, when part of battery cells 13 abnormally generates heat and the temperature of thermal expansion material member 36 reaches first predetermined temperature K1 or higher, adjacent battery cells 13 are connected to each other via the low thermal conductive route. This configuration inhibits or suppresses the spread of a thermal impact from battery cell 13 that has abnormally generated heat to other battery cells 13.

When the temperature of thermal expansion material member 36 is less than first predetermined temperature K1 under normal use conditions, adjacent battery cells 13 are connected to each other via the high thermal conductive route, which does not include thermal expansion material member 36. This facilitates the transfer of heat between adjacent battery cells 13. Thus, this configuration can prevent battery cells 13 from reaching an excessively high temperature and reduce variation in temperature among the plurality of battery cells 13.

First heat transfer component 30 and second heat transfer component 33 are metal plate members put into surface contact with the side surfaces of adjacent battery cells 13. This configuration readily reduces variation in temperature across the side surface of each battery cell 13.

Figure 6:
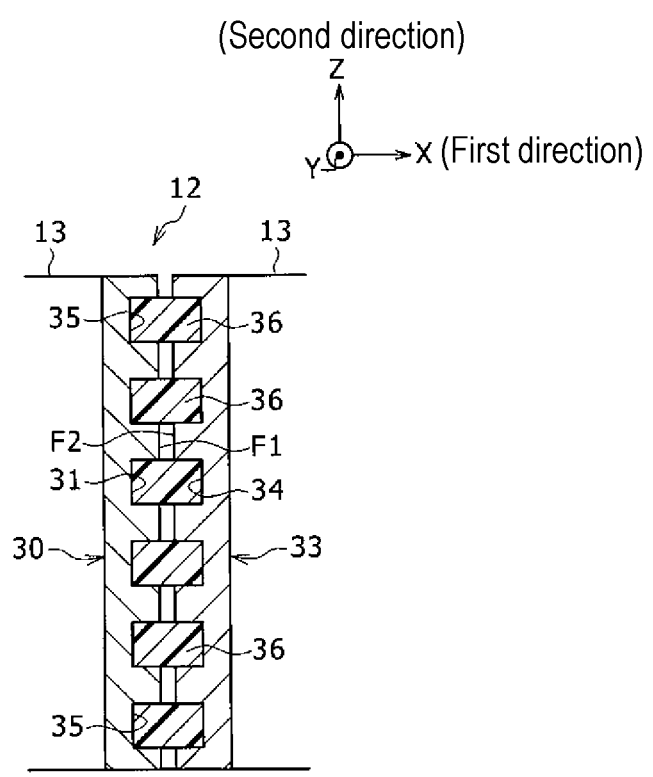
FIG. 6 is a diagram comparable to FIG. 5, illustrating a battery module according to another example of the exemplary embodiment.

FIG. 6 is a diagram comparable to FIG. 5, illustrating battery module 12 according to another example of the exemplary embodiment. In the battery module illustrated in FIG. 6, as compared with the configuration in FIG. 5, thermal expansion material member 36 expands only in longitudinal direction X and not in height direction Z when the temperature of thermal expansion material member 36 reaches first predetermined temperature K1 or higher. Thus, thermal expansion material member 36 does not go into the gap between end faces F1, F2 formed at places other than grooves 31, 34 in the opposed surfaces of first heat transfer component 30 and second heat transfer component 33. Even such a configuration can produce effects similar to those produced by the configuration illustrated in FIGS. 1 to 5. Apart from the description above, this example is similar in configuration and action to the example illustrated in FIGS. 1 to 5.

Figure 7:
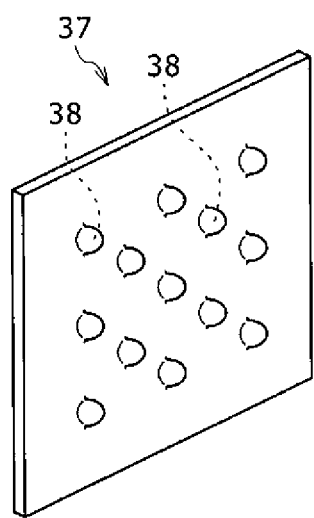
FIG. 7 is a perspective view of a first heat transfer component included in a battery module according to another example of the exemplary embodiment.

FIG. 7 is a perspective view of first heat transfer component 37 included in a battery module according to another example of the exemplary embodiment. In a configuration of this example, a surface of first heat transfer component 37 (a left surface in FIG. 7) placed face-to-face with a second heat transfer component (not illustrated) has a plurality of recesses 38 disposed at a plurality of scattered places. An opening shape of each recess 38 is, for example, a circle or a polygon such as a quadrilateral. The second heat transfer component (not illustrated) is similar in shape to first heat transfer component 37. A surface of the second heat transfer component that is placed face-to-face with first heat transfer component 37 has a plurality of recesses formed at a plurality of scattered places that face respective recesses 38 of first heat transfer component 30. In the opposed surfaces of first heat transfer component 30 and second heat transfer component 33, portions other than the recesses are put into surface contact with each other such that mutually combined recesses 38 of the two heat transfer components form a plurality of scattered sealed spaces. A thermal expansion material member is disposed in each of the sealed spaces such that each of the sealed spaces is filled with the thermal expansion material member. In terms of reducing variation in temperature across the surfaces of battery cells, it is preferred that surfaces of the first and second heat transfer components opposite respective recesses 38 be flat surfaces orthogonal to a thickness direction of the heat transfer components and that no protrusion be formed on the surfaces opposite the recesses.

In the configuration of this example as well, when part of the battery cells abnormally generates heat and the temperature of the thermal expansion material member reaches a first predetermined temperature or higher, the adjacent battery cells are connected to each other via a low thermal conductive route that includes the thermal expansion material member. This configuration inhibits the spread of a thermal impact from the battery cell that has abnormally generated heat to the other battery cells. When the temperature of the thermal expansion material member is less than the first predetermined temperature under normal use conditions, the adjacent battery cells are connected to each other via a high thermal conductive route that does not include the thermal expansion material member. This configuration can prevent the battery cells from reaching an excessively high temperature and reduce variation in temperature among the plurality of battery cells. Apart from the description above, this example is similar in configuration and action (=function) to the example illustrated in FIGS. 1 to 5.

Figure 8:
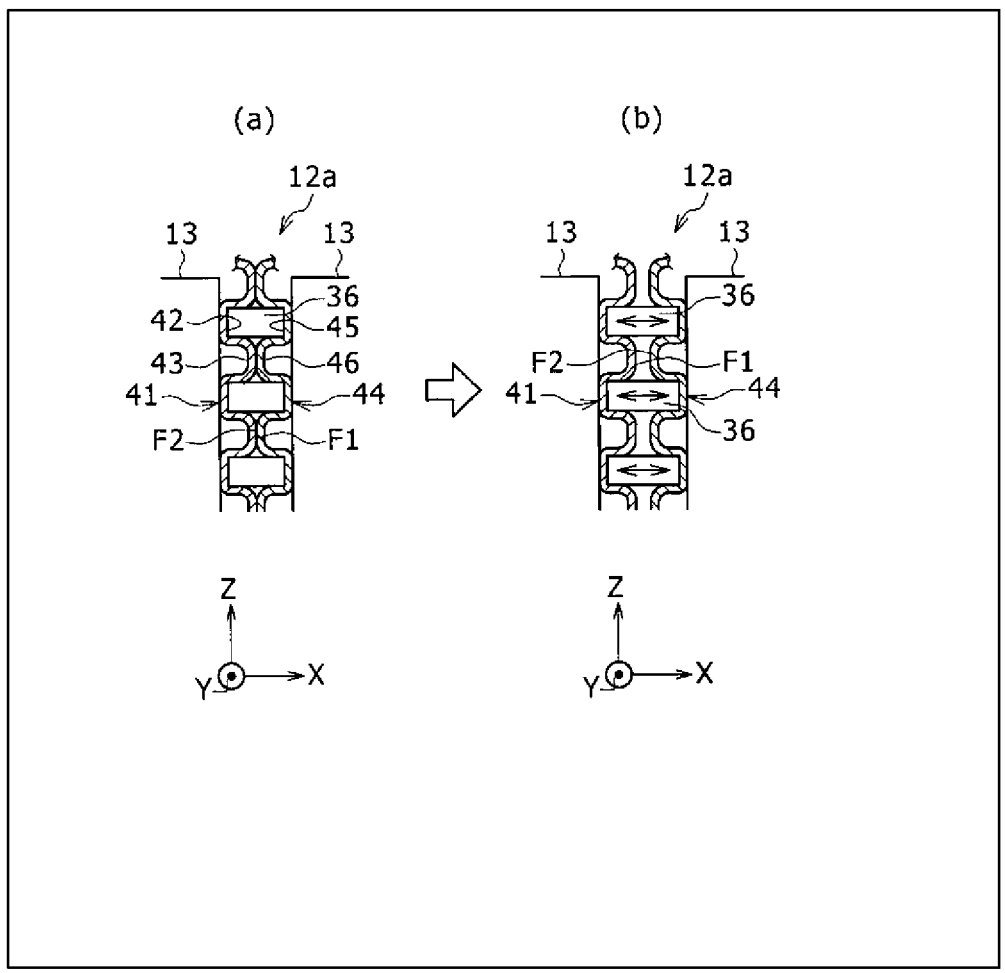
FIG. 8 is a diagram comparable to part C of FIG. 3, illustrating a battery module according to another example of the exemplary embodiment under (a) normal use conditions and under (b) conditions of abnormal heat generation.

FIG. 8 is a diagram comparable to part C of FIG. 3, illustrating battery module 12a according to another example of the exemplary embodiment under (a) normal use conditions and under (b) conditions of abnormal heat generation. In a configuration of this example, first and second heat transfer components 41, 44 each have a thickness that is substantially uniform along an entire surface area. Specifically, surfaces of heat transfer components 41, 44 adjacent to battery cells 13 form parallel grooves 43, 46 extending in lateral direction Y at a plurality of places that differ from grooves 42, 45 in height direction Z. Grooves 42, 45 are formed by surfaces of the heat transfer components adjacent to thermal expansion material member 36. As a result, each of heat transfer components 41, 44 is formed into a corrugated sheet having a thickness that is substantially uniform along the entire surface area. Under normal use conditions, as illustrated in FIG. 8(a), first and second heat transfer components 41, 44 are put into contact with each other through end faces F1, F2 formed at places different from grooves 42, 45 adjacent to the thermal expansion material member, and adjacent battery cells 13 are connected to each other via a high thermal conductive route that does not include thermal expansion material member 36. Meanwhile, under conditions of abnormal heat generation, as illustrated in FIG. 8(b), as each thermal expansion material member 36 expands in longitudinal direction X, first and second heat transfer components 41, 44 are separated from each other and get into a state of noncontact, and thus adjacent battery cells 13 are connected to each other via a low thermal conductive route that includes thermal expansion material member 36. Apart from the description above, this example is similar in configuration and action to the example illustrated in FIGS. 1 to 5.

Figure 9:
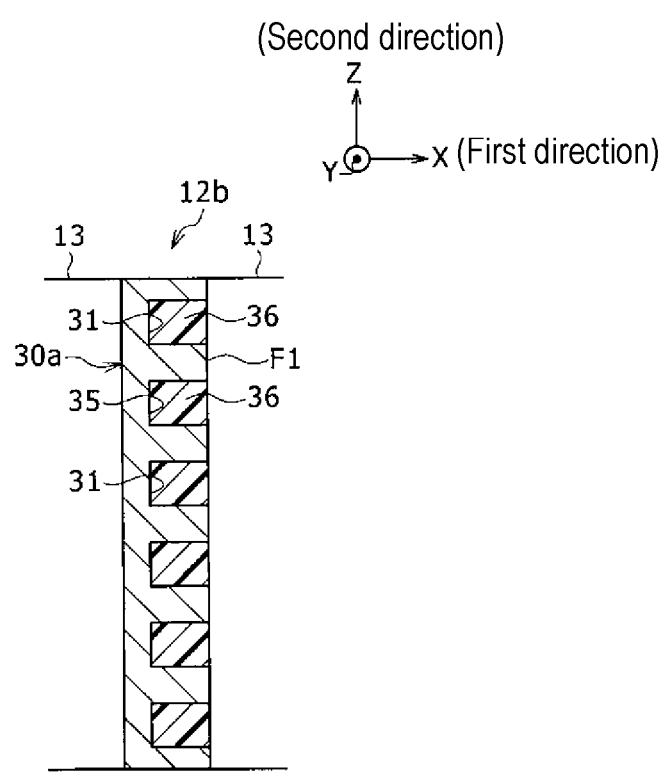
FIG. 9 is a diagram comparable to FIG. 5, illustrating a battery module according to another example of the exemplary embodiment.

FIG. 9 is a diagram comparable to FIG. 5, illustrating battery module 12b according to another example of the exemplary embodiment. In a configuration of this example, the battery module includes only first heat transfer component 30a and pieces of thermal expansion material member 36 disposed between battery cells 13 adjacent to each other in longitudinal direction X without second heat transfer component 33 (see FIG. 3). First heat transfer component 30a is similar in basic shape to first heat transfer component 30 illustrated in FIG. 3. In this example, a side surface of first heat transfer component 30a opposite grooves 31 is put into contact with a side surface of battery cell 13 that is one of adjacent battery cells 13 (the left-side battery cell in FIG. 9) in longitudinal direction X. Meanwhile, in a side surface of first heat transfer component 30a adjacent to grooves 31, end faces F1 formed at places other than grooves 31 in height direction Z are put into contact with a side surface of battery cell 13 that is the other adjacent battery cell 13 (the right-side battery cell in FIG. 9) in longitudinal direction X. Thus, the plurality of heat-transfer inner rooms 35, linear spaces extending in lateral direction Y, are formed between the plurality of grooves 31 of first heat transfer component 30a and the side surface of other adjacent battery cell 13 in longitudinal direction X.

Thermal expansion material member 36 is disposed in each of the plurality of heat-transfer inner rooms 35 such that each of the inner rooms is filled with the thermal expansion material member. Thus, when the temperature of thermal expansion material member 36 is less than first predetermined temperature K1, thermal expansion material member 36 does not expand and hence end faces F1 of first heat transfer component 30a are put into contact with the side surface of other adjacent battery cell 13 in longitudinal direction X. As a result, adjacent battery cells 13 are connected to each other via a high thermal conductive route including first heat transfer component 30a and having a first thermal conductivity.

Meanwhile, when the temperature of thermal expansion material member 36 is higher than or equal to first predetermined temperature K1, each thermal expansion material member 36 expands in longitudinal direction X, and end faces F1 of first heat transfer component 30a and the side surface of other adjacent battery cell 13 in longitudinal direction X are thereby separated from each other in longitudinal direction X and get into a state of noncontact. In this state, thermal expansion material member 36 may go into a gap between end faces F1 of first heat transfer component 30a and the side surface of other adjacent battery cell 13 in longitudinal direction X. As a result, when the temperature of thermal expansion material member 36 is higher than or equal to first predetermined temperature K1, adjacent battery cells 13 are connected to each other via a low thermal conductive route having a second thermal conductivity lower than the first thermal conductivity. This configuration, in a similar way to the configuration illustrated in FIGS. 1 to 5, can inhibit the spread of a thermal impact created when part of battery cells 13 abnormally generates heat due to the occurrence of an anomaly while battery module 12 is in use. This configuration can also reduce variation in temperature among the plurality of battery cells 13 and prevent battery cells 13 from reaching an excessively high temperature under normal use conditions. Apart from the description above, this example is similar in configuration and action to the example illustrated in FIGS. 1 to 5.

Figure 10:
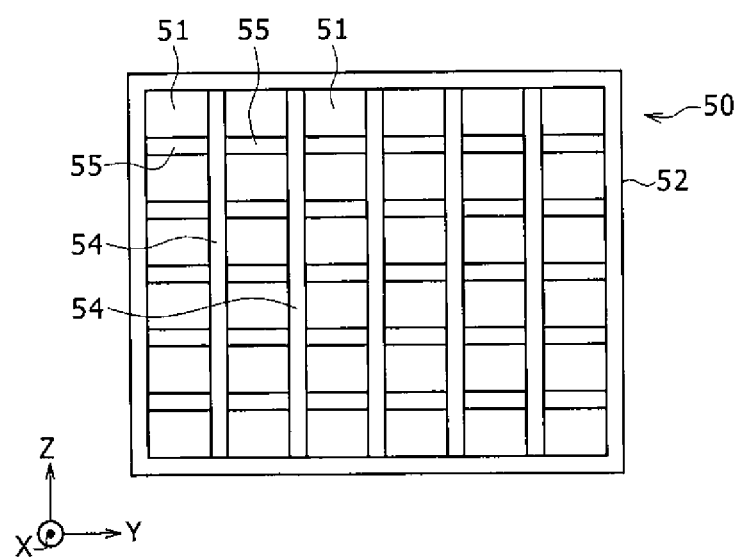
FIG. 10 is a drawing illustrating a first heat transfer component included in a battery module according to another example of the exemplary embodiment.
Figure 11:
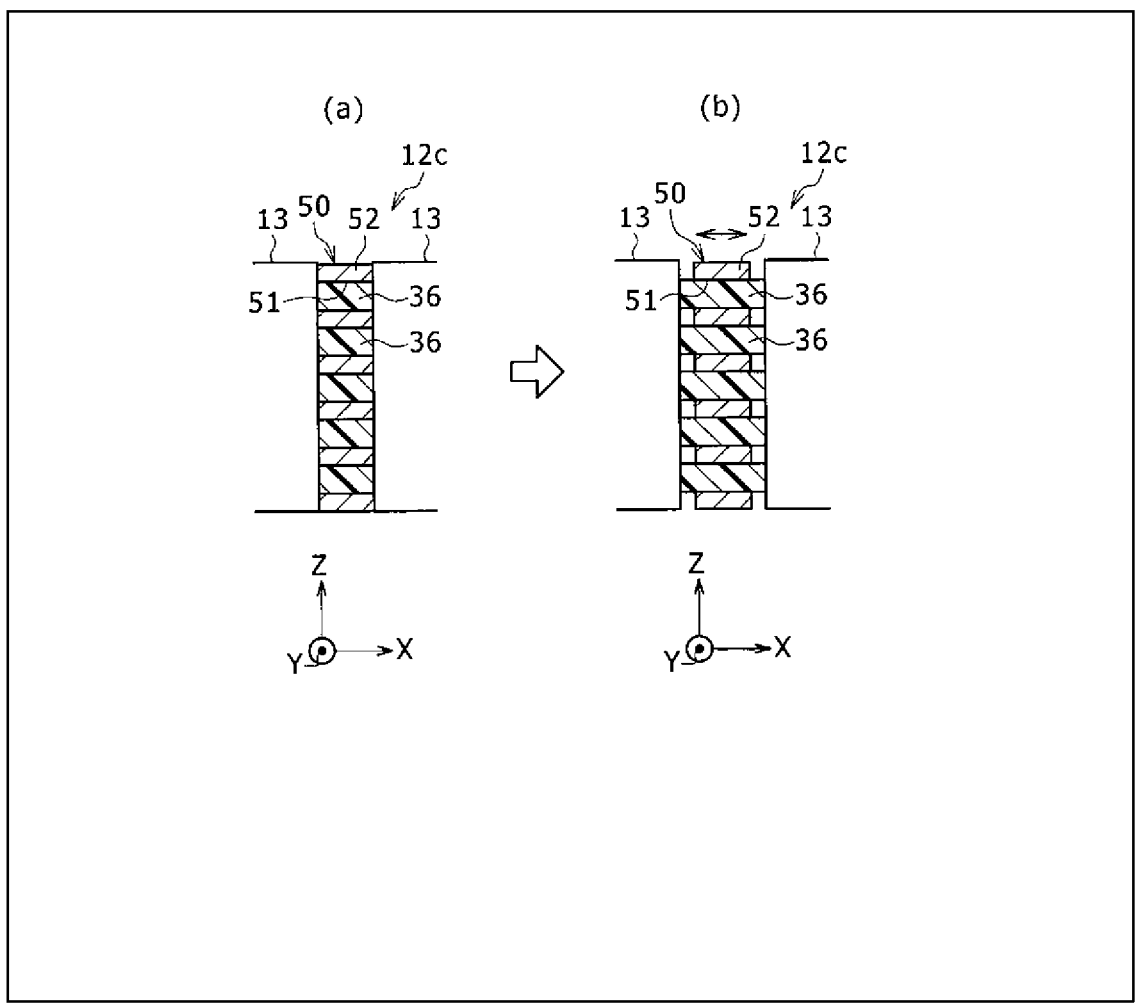
FIG. 11 is a drawing comparable to FIG. 3, illustrating the battery module including the first heat transfer component illustrated in FIG. 10 under (a) normal use conditions and under (b) conditions of abnormal heat generation.

FIG. 10 is a diagram illustrating heat transfer component 50 included in battery module 12c (see FIG. 11) according to another example of the exemplary embodiment. FIG. 11 is a diagram comparable to FIG. 3, illustrating battery module 12c including heat transfer component 50 illustrated in FIG. 10 under (a) normal use conditions and under (b) conditions of abnormal heat generation.

In battery module 12c, heat transfer component 50 and pieces of thermal expansion material member 36 are disposed between adjacent battery cells 13. Heat transfer component 50 is equivalent to the first heat transfer component.

Heat transfer component 50 is a latticed member having a plurality of through holes 51 and is made of a metallic material or other material with high thermal conductivity, such as iron or aluminum alloy. Heat transfer component 50 includes frame 52 having a rectangular tubular shape and lattice 53 joined to an inside of frame 52. Lattice 53 is, for example, made up of a plurality of first plates 54 extending in height direction Z and being separated from one another in lateral direction Y and a plurality of second plates 55 being aligned along lateral direction Y and being joined between the plurality of first plates 54 and between first plate 54 and each of inner surfaces of frame 52 in lateral direction Y. Frame 52, first plates 54, and second plates 55 have a substantially equal length in longitudinal direction X. Thus, the plurality of through holes 51 each having a rectangular tubular shape are formed in heat transfer component 50.

As illustrated in FIG. 11, thermal expansion material member 36 is disposed in the plurality of through holes 51. Thermal expansion material member 36 may be disposed only in some of the plurality of through holes 51. Thermal expansion material member 36 is lower in thermal conductivity than heat transfer component 50 and expands at first predetermined temperature K1 or higher and does not expand at temperatures less than first predetermined temperature K1.

In battery module 12c that is built up, heat transfer component 50 is disposed between adjacent battery cells 13 such that ends of heat transfer component 50 in longitudinal direction X are put into contact with side surfaces of battery cells 13. When the temperature of thermal expansion material member 36 is less than first predetermined temperature K1, thermal expansion material member 36, as illustrated in FIG. 11(a), does not expand and adjacent battery cells 13 are put into contact with heat transfer component 50. Meanwhile, when the temperature of thermal expansion material member 36 is higher than or equal to first predetermined temperature K1, thermal expansion material member 36, as illustrated in FIG. 11(b), expands in longitudinal direction X and both adjacent battery cells 13 and heat transfer component 50 are thereby separated from each other in longitudinal direction X and get into a state of noncontact. Only one of adjacent battery cells 13 and heat transfer component 50 may be separated from each other in longitudinal direction X and get into a state of noncontact.

While battery module 12c is under normal use conditions, adjacent battery cells 13 are connected to each other via a high thermal conductive route that does not include thermal expansion material member 36. Meanwhile, under conditions of abnormal heat generation, heat transfer component 50 and battery cell 13 are separated from each other and get into a state of noncontact, and thus adjacent battery cells 13 are connected to each other via a low thermal conductive route that includes thermal expansion material member 36. Apart from the description above, this example is similar in configuration and action to the example illustrated in FIGS. 1 to 5.

Figure 12:
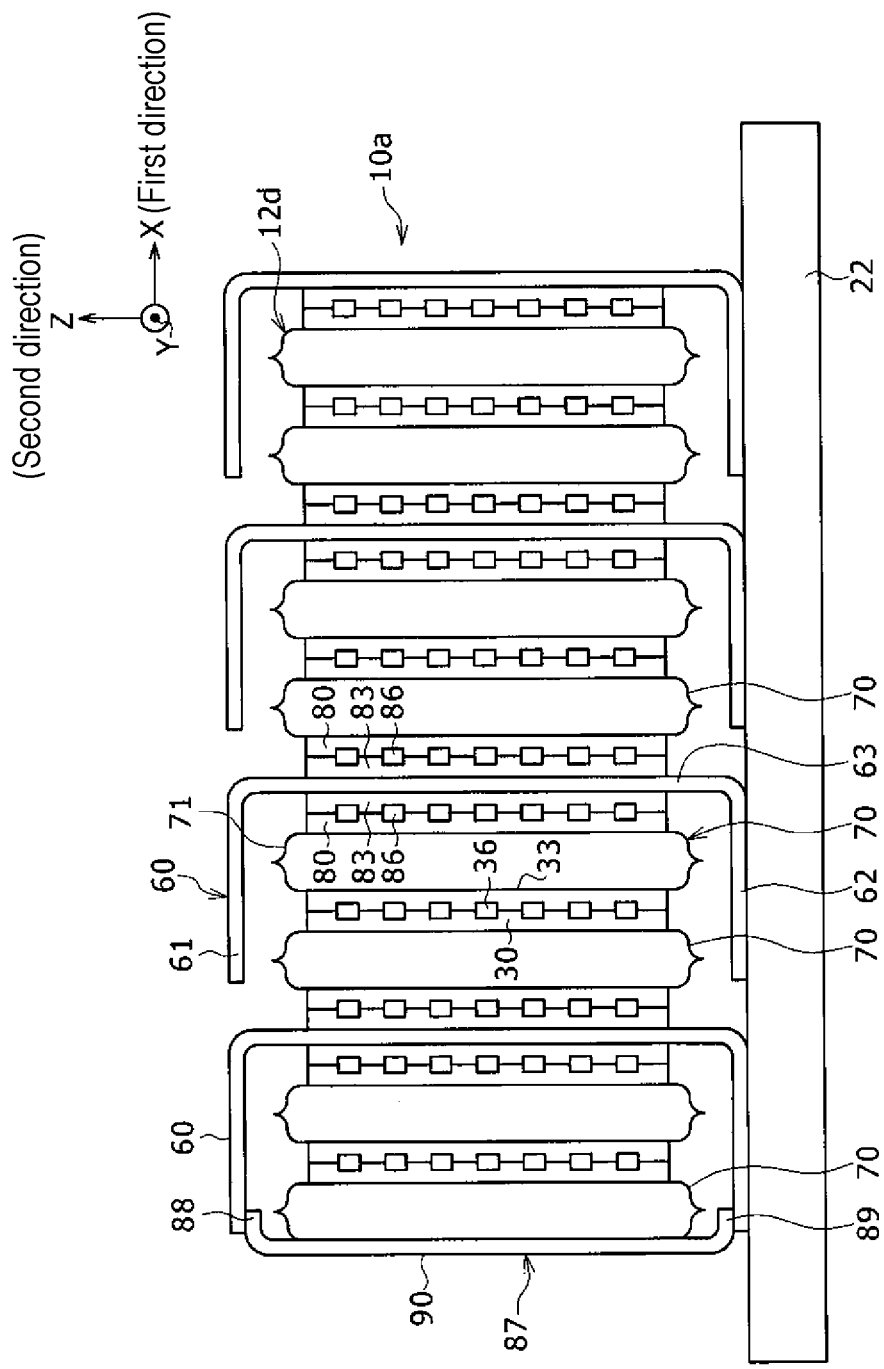
FIG. 12 is a cross-sectional view of a battery pack including a battery module according to another example of the exemplary embodiment, with some components omitted.
Figure 13:
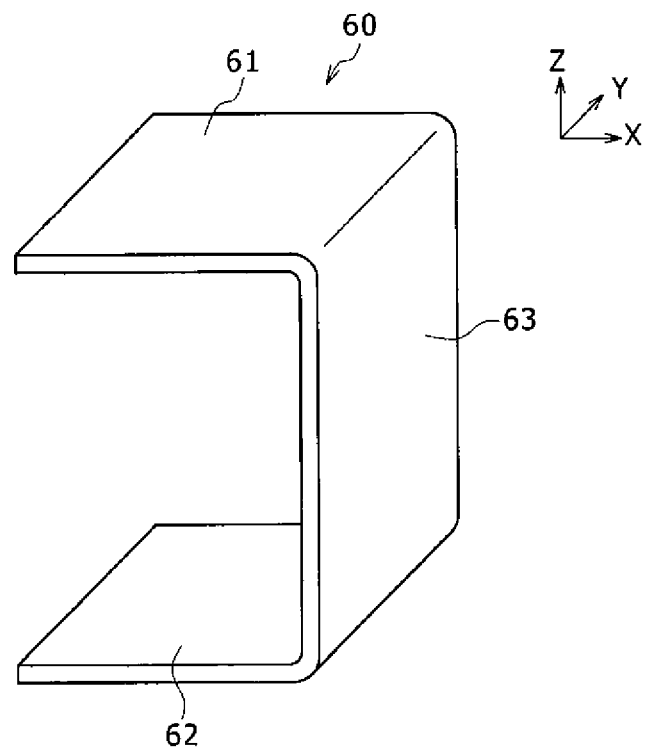
FIG. 13 is a perspective view of a third heat transfer component included in the battery pack illustrated in the other example of FIG. 12.

FIG. 12 is a cross-sectional view of battery pack 10a including battery module 12d according to another example of the exemplary embodiment, with some components omitted. FIG. 13 is a perspective view of third heat transfer component 60 included in battery pack 10a illustrated in the other example of FIG. 12.

Battery pack 10a of this example includes a plurality of battery modules 12d. Each battery module 12d includes a plurality of pouch battery cells 70 arranged side by side in longitudinal direction X. Cell case 71 of battery cell 70 is formed by sealing a periphery of a pair of laminated sheets that are each made by laminating a metal sheet on an insulating resin film and integrating the metal sheet and the resin film together. An electrode assembly (not illustrated) is disposed inside cell case 71.

In battery module 12d, first heat transfer component 30, pieces of thermal expansion material member 36, and second heat transfer component 33 are disposed in every alternate spaces of a plurality of spaces each between adjacent battery cells 70 that are separated from each other in longitudinal direction X. In battery module 12d, third heat transfer component 60 is disposed in the remaining every alternate spaces of the plurality of spaces each between adjacent battery cells 70.

As illustrated in FIG. 13, third heat transfer component 60 has a substantially U-shaped cross section and includes two parallel upper plate part 61 and lower plate part 62 disposed separate from each other in height direction Z and intermediate plate part 63 extending in height direction Z and being joined to ends of upper and lower plate parts 61, 62. Lower plate part 62 is equivalent to a first part, whereas intermediate plate part 63 is equivalent to a second part. Third heat transfer component 60 is disposed on an upper surface of bottom plate 22 constituting a part of the pack case and being equivalent to a cooling plate and is connected to bottom plate 22 such that heat is transferable between the two connected parts. Third heat transfer component 60 has a function of radiating heat from battery cells 70 to bottom plate 22. Hence, intermediate plate part 63 of third heat transfer component 60 is disposed in the remaining every alternate spaces of the plurality of spaces each between adjacent battery cells 70. In this state, upper plate part 61 is disposed above two battery cells 70 arranged in longitudinal direction X, extending to a first side in longitudinal direction X (leftward in FIG. 12), and lower plate part 62 is disposed below two battery cells 70 arranged in longitudinal direction X, extending to the first side in longitudinal direction X. In battery module 12 that is built up, the lower plate part is put into surface contact with the upper surface of the bottom plate. A thermal conductivity of third heat transfer component 60 is greater than or equal to 200 W/m·K, for example.

End heat transfer component 87 is disposed on an outside surface of battery cell 70 that is disposed at a first end (a left end in FIG. 12) of battery module 12d in longitudinal direction X. End heat transfer component 87 is shaped such that upper plate part 88 and lower plate part 89 are shorter in longitudinal direction X than upper plate part 61 and lower plate part 62 of third heat transfer component 60. End heat transfer component 87 is disposed such that an inside surface of intermediate plate part 90 of end heat transfer component 87 is put into contact with the outside surface of battery cell 70 that is disposed at the first end of battery module 12d in the longitudinal direction. End heat transfer component 87 is put into contact with third heat transfer component 60 such that upper plate part 88 and lower plate part 89 of end heat transfer component 87 are fit onto insides of upper plate part 61 and lower plate part 62 of third heat transfer component 60.

Thus, bottom plate 22 of the pack case is disposed on a lower side of battery module 12d, i.e., a first side in height direction Z orthogonal to longitudinal direction X. Lower plate part 62 of third heat transfer component 60 is put into contact with bottom plate 22 of the pack case, and intermediate plate part 63 of third heat transfer component 60 is disposed in every other space between adjacent battery cells 70.

Further, fourth heat transfer component 80, pieces of thermal expansion material member 86, and fifth heat transfer component 83 are disposed between each of adjacent battery cells 70 and intermediate plate part 63 of third heat transfer component 60. Thermal expansion material member 86 is equivalent to a second thermal expansion material member.

Fourth heat transfer component 80 and fifth heat transfer component 83 are similar in shape to first heat transfer component 30 and second heat transfer component 33 respectively. Fourth heat transfer component 80 and fifth heat transfer component 83 have grooves in respective side surfaces facing each other, and end faces of the heat transfer components formed at places other than the grooves in height direction Z are put into contact with each other. The grooves in fourth heat transfer component 80 and fifth heat transfer component 83 form a plurality of heat-transfer inner rooms, and thermal expansion material member 36 is disposed in each of the heat-transfer inner rooms such that each of the inner rooms is filled with the thermal expansion material member. A thermal conductivity of each of fourth heat transfer component 80 and fifth heat transfer component 83 is greater than or equal to 200 W/m·K, for example.

Thermal expansion material member 86 between fourth heat transfer component 80 and fifth heat transfer component 83 has a thermal conductivity lower than that of each of third, fourth and fifth heat transfer components 60, 80, 83. Thermal expansion material member 86 expands at second predetermined temperature K2 or higher and does not expand at temperatures less than second predetermined temperature K2. The thermal conductivity of thermal expansion material member 86 is, for example, less than 0.2 W/m·K. When temperature of thermal expansion material member 86 is less than second predetermined temperature K2, battery cell 70 and intermediate plate part 63 of third heat transfer component 60 are connected to each other via a high thermal conductive route including fourth and fifth heat transfer components 80, 83 and having a third thermal conductivity. Meanwhile, when the temperature of thermal expansion material member 86 is higher than or equal to second predetermined temperature K2, each thermal expansion material member 86 expands and fourth and fifth heat transfer components 80, 83 are thereby separated from each other between battery cell 70 and intermediate plate part 63 of third heat transfer component 60. As a result, battery cell 70 and intermediate plate part 63 are connected to each other via a low thermal conductive route having a fourth thermal conductivity lower than the third thermal conductivity.

For instance, the third thermal conductivity is greater than or equal to 120 W/m·K, and the fourth thermal conductivity is less than 1.0 W/m·K.

According to battery pack 10a of this example described above, when the temperature of thermal expansion material member 86 reaches second predetermined temperature K2 or higher, battery cell 70 and intermediate plate part 63 of third heat transfer component 60 are connected to each other via the low thermal conductive route having the fourth thermal conductivity. Thus, the battery pack configured to radiate heat to bottom plate 22, a cooling plate, through the heat transfer component between the adjacent battery cells can inhibit the spread of a thermal impact of battery cell 70 that has abnormally generated heat. When the temperature of thermal expansion material member 86 is less than second predetermined temperature K2 under normal use conditions, battery cell 70 and intermediate plate part 63 are connected to each other via the high thermal conductive route having the third thermal conductivity. This configuration can reduce variation in temperature among the plurality of battery cells 70 and cool the plurality of battery cells 70 by bottom plate 22 under normal use conditions. Apart from the description above, this example is similar in configuration and action to the example illustrated in FIGS. 1 to 5.

In the battery pack of this example, the fourth heat transfer component and fifth heat transfer component disposed between battery cell 70 and third heat transfer component 60 may be identical in configuration to first heat transfer component 30 and second heat transfer component 33 respectively. The thermal expansion material member disposed between battery cell 70 and third heat transfer component 60 may be identical in configuration to thermal expansion material member 36 disposed between adjacent battery cells 70. In this case, the thermal expansion material member between battery cell 70 and third heat transfer component 60 expands at temperatures higher than or equal to a second predetermined temperature that is identical to the first predetermined temperature at which thermal expansion material member 36 between adjacent battery cells 70 expands. Further, the third thermal conductivity is substantially equal to the first thermal conductivity, and the fourth thermal conductivity is substantially equal to the second thermal conductivity.

In the battery pack of this example described above, the bottom plate of the pack case is equivalent to a cooling plate. However, the pack case and the cooling plate may be separate members. In this case, the cooling plate is disposed on a top of the bottom plate of the pack case, and the battery module is disposed on a top of the cooling plate. If a battery pack has pouch battery cells 70 in the same way as the battery pack of this example, it is difficult to put lower ends of battery cells 70 into direct contact with a cooling plate. Hence, it is preferable to use a structure as in this example in which heat is radiated from battery cells 70 to the cooling plate through third heat transfer component 60. Meanwhile, in the battery pack of this example, the battery cells may be prismatic batteries.

In the examples described above, an elastic force is applied to the battery modules by the springs or elastic pieces inside the pack case so as to compress the battery modules in longitudinal direction X. However, the scope of the present disclosure is not limited to such a configuration. For instance, as in a configuration of another example illustrated in FIG. 14, the springs and elastic pieces may be omitted.

Figure 14:
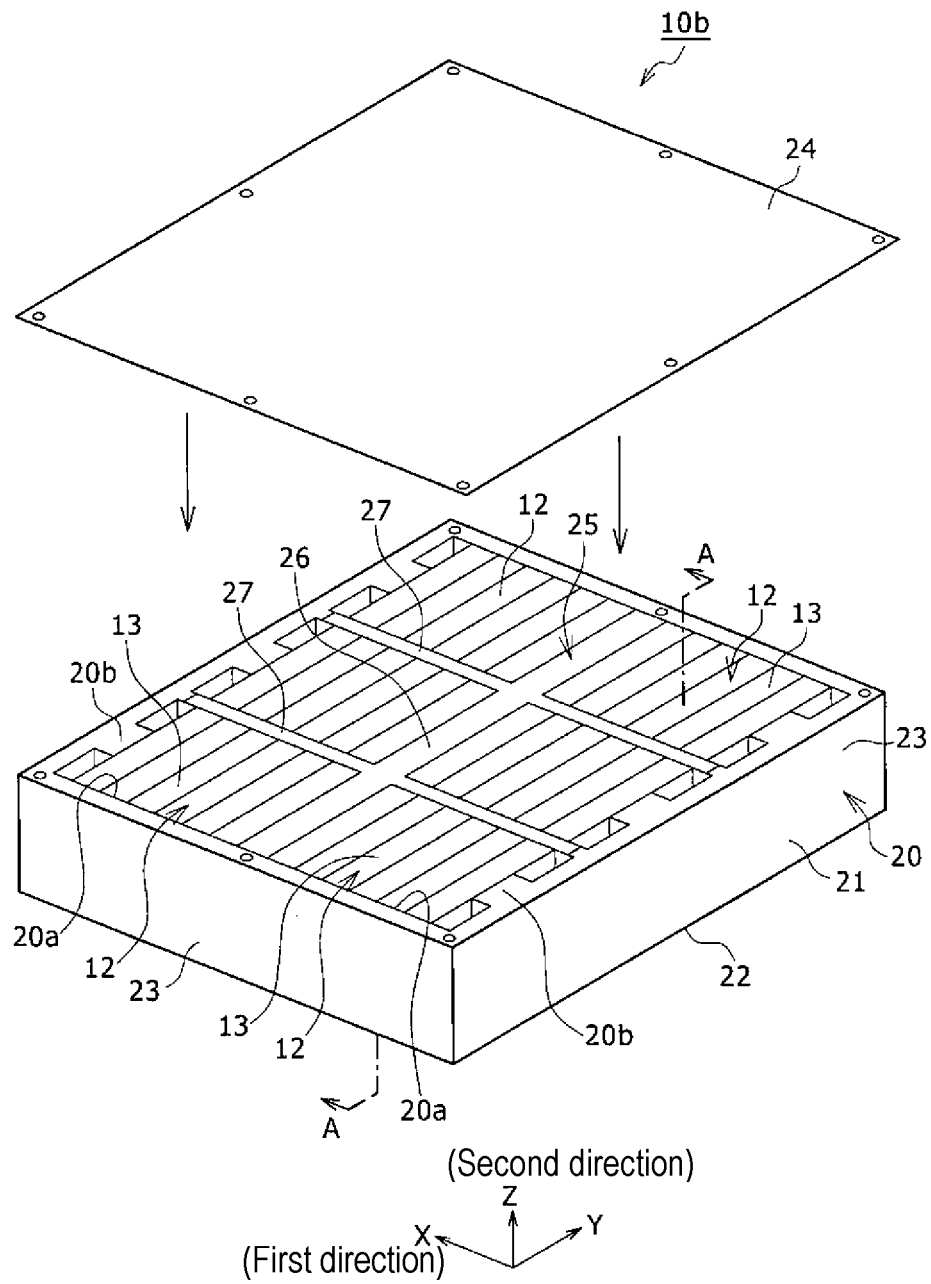
FIG. 14 is a diagram comparable to FIG. 1, illustrating a battery pack according to another example of the exemplary embodiment.

FIG. 14 is a diagram comparable to FIG. 1, illustrating battery pack 10*b* according to another example of the exemplary embodiment. In pack case 20 of the battery pack in this example, a maximum length of each of a plurality of battery storage rooms 20*a* in longitudinal direction X is slightly longer than a length of each battery module 12 in longitudinal direction X. Protrusion 20*b* projecting toward battery module 12 is formed partly on a side surface of each of the plurality of battery storage rooms 20*a* adjacent to outer peripheral wall 23 in longitudinal direction X. An end face of protrusion 20*b* is put into contact with a side surface of battery module 12 in longitudinal direction X. In this state, a length of each of the plurality of battery storage rooms 20*a* at a place of protrusion 20*b* in longitudinal direction X is equal to the length of battery module 12 in longitudinal direction X. Thus, in each battery module 12, when temperature of the thermal expansion material member between battery cells 13 is less than the first predetermined temperature under normal conditions, adjacent battery cells 13 are connected to each other via the high thermal conductive route including the first heat transfer component and second heat transfer component. This configuration can reduce variation in temperature among the plurality of battery cells and prevent battery cells 13 from reaching an excessively high temperature under normal use conditions. Meanwhile, when the temperature of the thermal expansion material member reaches the first predetermined temperature or higher in response to a rise in temperature of part of battery cells 13, the thermal expansion material member expands in longitudinal direction X and a portion of the outer peripheral wall of the pack case overlapping protrusion 20*b* is thereby pressed by the side surface of battery module 12 in longitudinal direction X and is elastically deformed outward. This elastically widens space between adjacent battery cells 13 in longitudinal direction X. As a result, adjacent battery cells 13 are connected to each other via the low thermal conductive route that includes thermal expansion material member 36. This configuration can inhibit the spread of a thermal impact of battery cell 13 that has abnormally generated heat.

The invention claimed is:
1. A battery module comprising:
a plurality of battery cells arranged side by side in a first direction and including a first battery cell and a second battery cell adjacent to the first battery cell; and
a first heat transfer component and a first thermal expansion material member that are disposed between at least the first battery cell and the second battery cell,
wherein the first thermal expansion material member has a thermal conductivity lower than a thermal conductivity of the first heat transfer component and expands at a first predetermined temperature or higher,
wherein when temperature of the first thermal expansion material member is less than the first predetermined temperature, the first and second battery cells are connected to each other via a high thermal conductive route including the first heat transfer component that touches at least one of the first and second battery cells and having a first thermal conductivity, and
wherein when the temperature of the first thermal expansion material member reaches the first predetermined temperature or higher, the first and second battery cells are connected to each other via a low thermal conductive route that has a second thermal conductivity lower than the first thermal conductivity and is constituted by the first thermal expansion material member, by cutting off the high thermal conductive route between the first and second battery cells by expansion of the first thermal expansion material member, wherein the low thermal conductive route does not include a route without the first thermal expansion material member.
2. The battery module according to claim 1,
wherein the first heat transfer component is disposed on a side of the first battery cell such that the first heat transfer component is put into contact with the first battery cell, and wherein the first thermal expansion material member is disposed on a side of the second battery cell in the first heat transfer component.

3. The battery module according to claim 2,
further comprising a second heat transfer component disposed on an opposite side of the first thermal expansion material member from the first heat transfer component between the first and second battery cells,
wherein the second heat transfer component is put into contact with the second battery cell and has a thermal conductivity higher than the thermal conductivity of the first thermal expansion material member,
wherein when the temperature of the first thermal expansion material member in a condition that the first thermal expansion material member does not expand is less than the first predetermined temperature, the first heat transfer component and the second heat transfer component are put into contact with each other, and the high thermal conductive route between the first battery cell and the second battery cell is formed, and
wherein when the temperature of the first thermal expansion material member reaches the first predetermined temperature or higher, the first thermal expansion material member expands and the first heat transfer component and the second heat transfer component get into a state of noncontact.

4. The battery module according to claim 3,
wherein the first heat transfer component and the second heat transfer component are metal plate members put into surface contact with side surfaces of the first and second battery cells, respectively.

5. The battery module according to claim 1,
wherein the first heat transfer component is a latticed member having a plurality of through holes,
wherein the first thermal expansion material member is disposed in at least one of the plurality of through holes,
wherein when the temperature of the first thermal expansion material member is less than the first predetermined temperature, the first and second battery cells are put into contact with the first heat transfer component, and
wherein when the temperature of the first thermal expansion material member reaches the first predetermined temperature or higher, at least one of the first and second battery cells and the first heat transfer component get into a state of noncontact.

6. A battery pack comprising:
the battery module according to claim 1;
a cooling plate disposed on a first side of the battery module in a second direction orthogonal to the first direction;
a third heat transfer component comprising:
   a first part put into contact with the cooling plate; and
   a second part disposed between the first and second battery cells; and
a fourth heat transfer component and a second thermal expansion material member that are disposed between each of the first and second battery cells and the second part,
wherein the second thermal expansion material member has a thermal conductivity lower than thermal conductivities of the third heat transfer component and the fourth heat transfer component and expands at a second predetermined temperature or higher,
wherein when temperature of the second thermal expansion material member is less than the second predetermined temperature, each of the first and second cells and the second part are connected to each other via a high thermal conductive route including the fourth heat transfer component and having a third thermal conductivity, and
wherein when the temperature of the second thermal expansion material member reaches the second predetermined temperature or higher, each of the first and second battery cells and the second part are connected to each other via a low thermal conductive route having a fourth thermal conductivity lower than the third thermal conductivity.

7. The battery module according to claim 1,
wherein when the temperature of the first thermal expansion material member reaches the first predetermined temperature or higher, the first heat transfer component is separated from the at least one of the first and second battery cells.

* * * * *